(12) United States Patent
Polen

(10) Patent No.: US 10,330,249 B1
(45) Date of Patent: Jun. 25, 2019

(54) CLIP

(71) Applicant: Michael K. Polen, Tampa, FL (US)

(72) Inventor: Michael K. Polen, Tampa, FL (US)

( * ) Notice: Subject to any disclaimer, the term of this patent is extended or adjusted under 35 U.S.C. 154(b) by 198 days.

(21) Appl. No.: 14/950,994

(22) Filed: Nov. 24, 2015

Related U.S. Application Data

(60) Provisional application No. 62/119,737, filed on Feb. 23, 2015.

(51) Int. Cl.
F16M 11/00 (2006.01)
F16M 13/02 (2006.01)
F16M 13/06 (2006.01)
F16B 2/10 (2006.01)

(52) U.S. Cl.
CPC .............. F16M 13/02 (2013.01); F16B 2/10 (2013.01); F16M 13/06 (2013.01)

(58) Field of Classification Search
CPC ................................ F16B 2/065; B64C 1/066
See application file for complete search history.

(56) References Cited

U.S. PATENT DOCUMENTS

| 714,348 A | 11/1902 | Youngblood | |
| 2,319,521 A * | 5/1943 | Schneider | B60D 1/56 24/569 |
| 4,822,348 A * | 4/1989 | Casey | A61F 6/206 604/346 |
| 5,388,313 A | 2/1995 | Cameron | |
| 7,308,739 B2 | 12/2007 | Anderson et al. | |
| 9,249,813 B2 * | 2/2016 | Kalman | B64C 1/066 |
| 9,267,517 B2 * | 2/2016 | Wilson | B60J 7/104 |
| 2003/0115726 A1 | 6/2003 | Liao | |
| 2013/0025093 A1 | 1/2013 | Liao | |
| 2014/0338133 A1 * | 11/2014 | Gonzalez | B25F 1/003 7/128 |
| 2015/0162670 A1 * | 6/2015 | Galla | H01R 43/01 29/872 |

* cited by examiner

Primary Examiner — Amy J. Sterling
(74) Attorney, Agent, or Firm — Chad Peterson

(57) ABSTRACT

A clip having a first jaw member hingedly connected to a second jaw member wherein the clip is biased in an open position. The clip further includes a keeper having a knob and shaft wherein the knob is superposed the first jaw member. The shaft of the keeper engages with a receiver that is pivotally mounted to the second jaw member so as to facilitate the movement of the clip. A passage network and connectors are configured in the bottom of the second jaw member to facilitate the securing of the clip to a somewhat vertically oriented rope. The bottom of the second jaw member is also configured with arm members and a channel to facilitate the suspension of the clip from a somewhat horizontally oriented rope. The second jaw member is further configured with a series of slots to facilitate attachment of the clip to a strap.

83 Claims, 6 Drawing Sheets

CLIP

PRIORITY UNDER 35 U.S.C SECTION 119(E) & 37 C.F.R. SECTION 1.78

This nonprovisional application claims priority based upon the following prior United States Provisional Patent Application entitled: Clip, Application No.: 62/119,737 filed Feb. 23, 2015, in the name of Michael K. Polen, which is hereby incorporated by reference for all purposes.

FIELD OF THE INVENTION

The present invention relates generally to fastening devices, more specifically but not by way of limitation a clip that is operable to secure an object or a portion thereof intermediate a first jaw member and a second jaw member that further includes a threaded fastener and a pivotally mounted receiver to improve the fastening process.

BACKGROUND

Numerous types of clips exist in the market place and are utilized in a variety of applications. Clips such as spring loaded plastic clips are used to provide temporary closure of items such as but not limited to plastic bags. Spring loaded clips are further configured to provide generally light closing pressure that is defined by the force of its spring(s). Other conventional clips include clothesline clips that are constructed to provide suspension of an article of clothing from a horizontally mounted rope in order to accomplish a task such as but not limited to drying.

Still other types of conventional clips include those that are constructed for various industrial applications such as but not limited to securing tarps. As is known in the art, commercial tarps typically have integrated grommets that routinely fail and there exists in the marketplace clips that are constructed to provide a technique for securing a tarp over a desired object so as to avoid damaging a grommet or function in the replacement thereof.

Conventional clips are sometimes configured with toothed jaw members and other features in an attempt to provide improved attachment to an object. Clips having locks and/or fastening elements are further available and also attempt to improve the force with which a clip can exert and maintain on an object inserted in between the jaws thereof.

One of the most significant limitations of the aforementioned conventional clips is their inability to move and retain the opposing jaw members to an open position such that the opposing jaw members have a wide degree of separation to support easier loading and gripping of thicker material. Current utilization of locking members or integrated tightening bolts restrict the ability of the opposing jaw members to be adequately opened in order to accommodate certain types of objects or thicknesses thereof.

Accordingly, there is a need for a clip that includes a fastening member that provides for a controlled clamping force of the clip and wherein the clip jaw members can be moved to a biased open position having a potential range of approximately ninety degrees and are operable to grip different shapes and sizes of objects.

SUMMARY OF THE INVENTION

It is the object of the present invention to provide a fastening clip operable to engage an object or a portion thereof that includes a first jaw member and a second jaw member that are hingedly connected proximate the second ends thereof.

Another object of the present invention is to provide a fastening clip that is operable to secure an object or a portion thereof intermediate the first jaw member and second jaw member wherein the first jaw member and second jaw member include first ends that are configured with an engagement member constructed from materials operable to inhibit damage to the object intermediate the first jaw member and second jaw member and/or provide improved gripping thereof.

A further object of the present invention is to provide a fastening clip operable to secure an object intermediate its first jaw member and second jaw member wherein the second jaw member includes a receiver mounting member.

An additional object of the present invention is to provide a fastening clip operable to secure an object or a portion thereof in between its first jaw member and second jaw member wherein the receiver mounting member further includes a movably mounted receiver.

Still an additional object of the present invention is to provide a fastening clip having opposing jaw members wherein the opposing jaw members are biased in an open position with a spring or similar element.

Still a further object of the present invention is to provide a fastening clip having a first jaw member and a second jaw member that are hingedly connected that further includes a means for providing user controlled closing force. More specifically but not by way of limitation, a threaded shaft of a keeper is journaled through an aperture in the first jaw member and is operably coupled with the movably mounted receiver.

Yet a further object of the present invention is to provide a fastening clip that further includes an adjustment knob for the keeper. More specifically but not by way of limitation, the adjustment knob is attached to the shaft of the keeper to provide a user interface for the keeper. The adjustment knob further facilitates the controlling of closure force and separation between the first jaw member and second jaw member.

Another object of the present invention is to provide a fastening clip having a first jaw member and a second jaw member wherein the adjustment knob is positioned above the top surface of the first jaw member and is configured to be engaged by a user without the need for a tool.

Yet another object of the present invention is to provide a fastening clip having a first jaw member and a second jaw member that is configured to be suspendedly secured to a horizontal rope or similar item. More specifically but not by way of limitation, the second jaw member includes integrally formed arm members and a channel proximate the second end thereof that are operable to couple an object such as but not limited to a rope.

Still a further object of the present invention is to provide a fastening clip having a first jaw member and a second jaw member operable to provide a controlled clamping force on an object intermediate thereto wherein the second jaw member includes a means to releasably secure the fastening clip to a vertical support structure such as but not limited to a rope. More specifically but not by way of limitation, the second jaw member has a leg member, a post member, and a passage network that is operable to couple an object such as but not limited to a rope.

An alternative object of the present invention is to provide a fastening clip with opposing jaw members wherein the second jaw member includes a means to operably couple to a strap. More specifically but not by way of limitation, the second jaw member has present at the second end thereof a ridge with at least one slot that is operable to receive a portion of a strap therethrough.

An additional object of the present invention is to provide a fastening clip that further includes at least one passage extending through the second jaw member wherein the at least one passage is operable to receive a nail or screw therethrough in order to secure the fastening clip to a suitable support structure.

Yet a further object of the present invention is to provide a fastening clip wherein the second jaw member includes at least one cavity so as to facilitate fastening to an optional accessory.

Still another object of the present invention is to provide a fastening clip having a first jaw member and a second jaw member that further includes at least one magnet wherein the at least one magnet is integrally secured to the bottom surface of the second jaw member and is operable to releasably secure the fastening clip to a suitable support structure.

Yet a further object of the present invention is to provide a fastening clip having opposing jaw members wherein an attachment ring may be releasably secured to at least one of the opposing jaw members so as to facilitate mounting to a suitable support structure such as, but not limited to a rope or tie-down.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the present invention.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
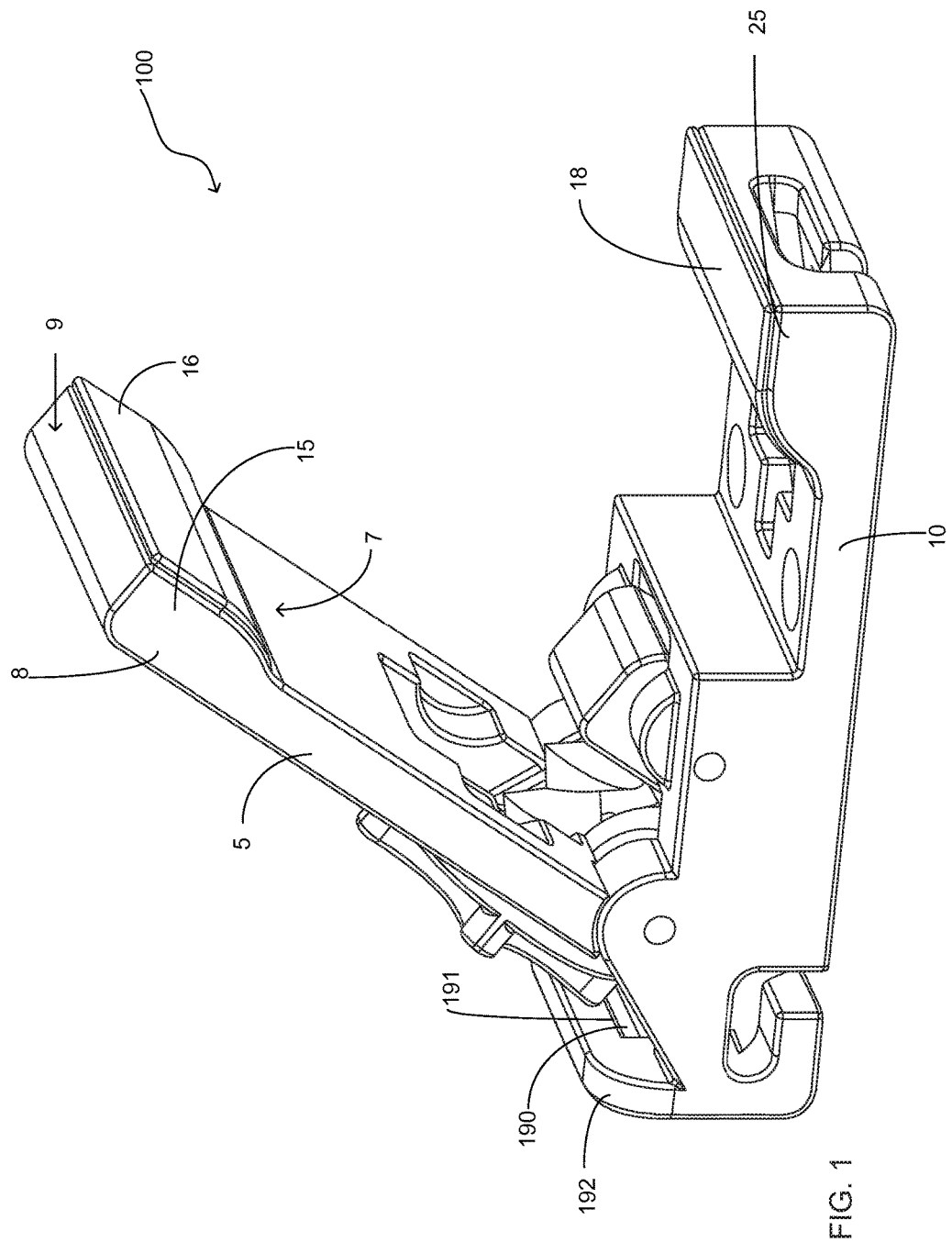
FIG. 1 is a perspective view of the present invention in an open position.

Referring now to the drawings submitted herewith, wherein various elements depicted therein are not necessarily drawn to scale and wherein through the views and figures like elements are referenced with identical reference numerals, there is illustrated a clip 100 constructed according to the principles of the present invention.

The clip 100 includes a first jaw member 5 and a second jaw member 10 that are hingedly connected and operable to move intermediate a first open position and a second closed position. Rotatably mounted to the second jaw member 10 is a receiver 50 which is configured to couple with keeper 30 wherein keeper 30 and receiver 50 are operable to transition the first jaw member 5 and second jaw member 10 intermediate the first open position and second closed position of the clip 100. As further discussed herein the bottom surface 60 of the second jaw member 10 is configured to provide several techniques of releasably securing the clip 100 to a rope, a strap, or similar objects as well as a solid ferromagnetic surface.

Figure 2:
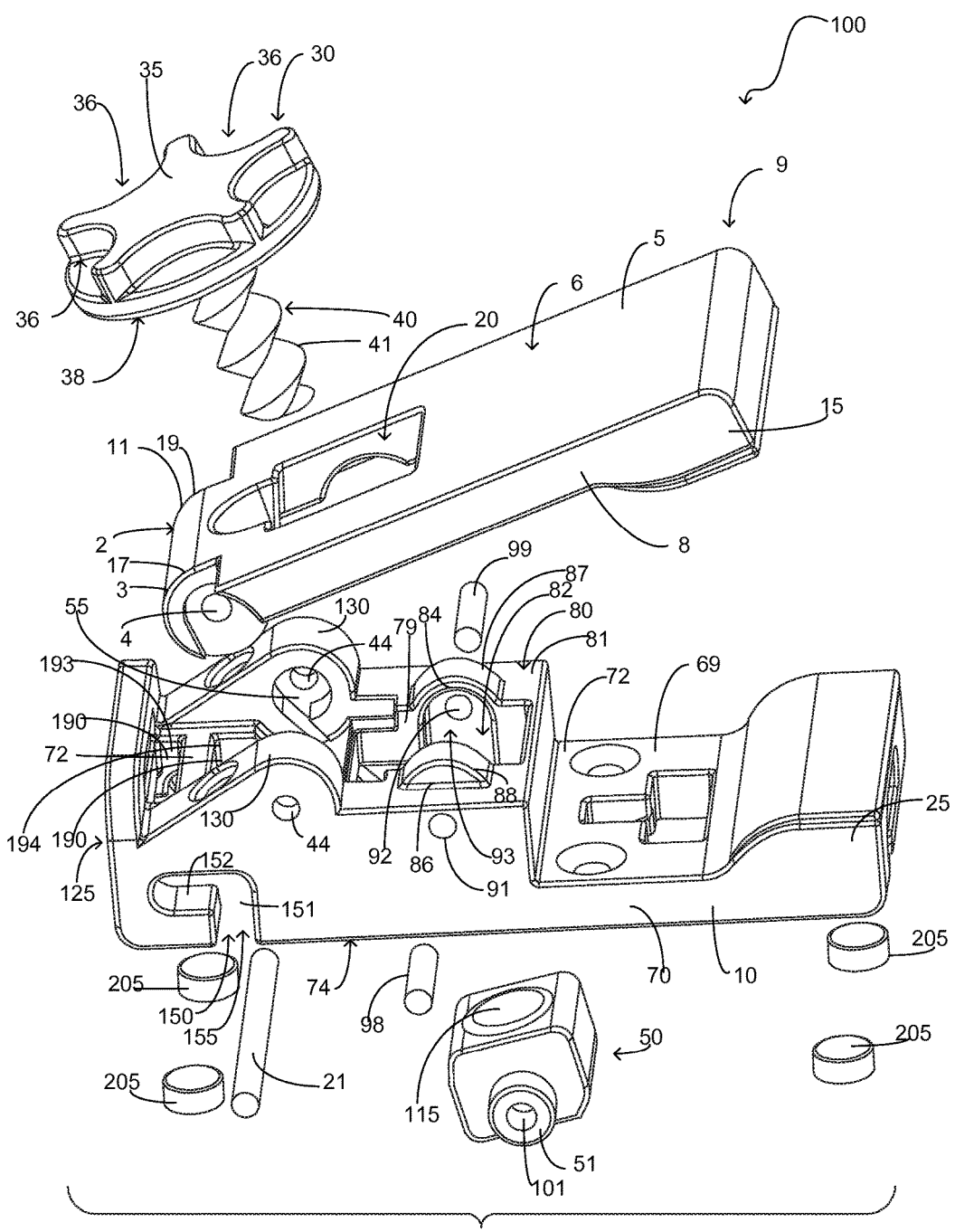
FIG. 2 is an exploded view of the present invention.

Referring in particular to FIG. 1 and FIG. 2 herein, the first jaw member 5 includes top surface 6, bottom surface 7 and sidewalls 8 (only one illustrated herein) contiguously formed to create a rectangular shape for the first jaw member 5. While top surface 6 of first jaw member 5 is illustrated herein as being a generally flat surface and first jaw member 5 is illustrated as being rectangular in shape, it is contemplated within the scope of the present invention that various different shapes and contours could be utilized. The first jaw member 5 further includes a first end 9 and a second end 11 and is manufactured from a suitable durable material such as but not limited to plastic. Formed on the first jaw member 5 on the bottom surface 7 proximate first end 9 is first engagement member 15. First engagement member 15 extends intermediate sidewalls 8 and extends downward beyond the bottom surface 7 and is operable to bias against the second engagement member 25 as further discussed herein. Formed on the second jaw member 10 on the top surface 72 proximate first end 124 is second engagement member 25. Second engagement member 25 extends intermediate sidewalls 70 and extends upward beyond the top surface 72. It is contemplated within the scope of the present invention that first engagement member 15 and second engagement member 25 could be formed in various different shapes and sizes. First engagement member 15 and second engagement member 25 includes gripping surface 16, 18 respectfully that is secured thereto utilizing suitable durable techniques. The gripping surface 16, 18 are manufactured from a suitable durable material such as but not limited to rubber and is operable to provide a nonslip and/or damage resistant hold on an object engaged by the clip 100. The utilization of gripping surface 16, 18 is contemplated as desired but optional. Formed within the first jaw member 5 is aperture 20. Aperture 20 is configured to receive therein keeper 30 and is shaped to accommodate movement of keeper 30. While aperture 20 is illustrated herein as being generally rectangular in shape, it is contemplated within the scope of the present invention that the aperture 20 could be formed in various different shapes and sizes. Additionally, it is further contemplated within the scope of the present invention that more than one keeper 30 could be utilized in conjunction with one or more aperture 20 to provide the functionality as further discussed herein wherein the keeper 30 is configured to move the first jaw member 5 and second jaw member 10 intermediate a first open position and a second closed position. It is further contemplated within the scope of the present invention that aperture 20 is shaped to receive a portion of receiver 50 therein upon the clip being moved proximate its second closed position.

The keeper 30 further includes knob 35 and shaft 40 that are integrally formed and are manufactured from a suitable durable material such as but not limited to plastic. The knob 35 includes indentations 36 that facilitate engagement with fingers of a human hand. Those skilled in the art will recognize that the knob 35 could be constructed in numerous manners so as to facilitate an ergonomic engagement with a user's hand so as to provide rotation thereof. While knob 35 and shaft 40 are illustrated herein as being integrally formed, it is contemplated within the scope of the present invention that knob 35 and shaft 40 may be separate components that are operably coupled together. Shaft 40 extends downward from knob 35 and journals through the aperture 20 and is configured to engage receiver 50 as further discussed herein. Shaft 40 includes threads 41 wherein threads 41 are operable to mateably engage receiver 50. While shaft 40 is illustrated herein as having threads 41, it is contemplated within the scope of the present invention that the shaft 40 could be configured with various elements so as to operably engage receiver 50. It is also contemplated within the scope of the present invention that the shaft 40 could be manufactured in various different lengths. Knob 35 is rotatable in a first direction and a second direction. In its first direction, the knob 35 is rotated so as to facilitate the movement of the first jaw member 5 towards the second jaw member 10. During execution of the aforementioned rotational movement of knob 35 in its first direction, the lower surface 38 of the knob 35 applies force to the top surface 6 of the first jaw member 5 and moves the first jaw member 5 towards the second jaw member 10. This movement is continued until the first engagement member 15 and second engagement member 25 are adjacent to each other or until a desired object intermediate engagement member 15 and engagement member 25 is satisfactorily grasped. During execution of the aforementioned rotational movement of knob 35 in its second direction, knob 35 is moved away from the rotatably mounted receiver 50 permitting the clip 100 open bias to move the first jaw member 5 away from the second jaw member 10. The opening and closing of the clip 100 can be expedited by the user applying gentle force onto the first jaw member 5 to establish or maintain a grasping or a closed position of clip 100 so as to allow the user the ability to adjust the keeper 30 substantially faster and easier while the open bias on the clip 100 is kept from reaching the keeper 30. It is contemplated within the scope of the present invention that knob 35 could engage first jaw member 5 using numerous different techniques and elements. It is also contemplated within the scope of the present invention that the first jaw member 5 and second jaw member 10 may be operable to open with a degree range therebetween of approximately ninety degrees so as to provide easy loading and the ability to grasp different shapes and sizes of objects. It is further contemplated within the scope of the present invention that the degree range between first jaw member 5 and the second jaw member 10 could be restricted to numerous positions having various angles therebetween.

Proximate second end 11 of first jaw member 5 is hinge mount 2. Hinge mount 2 is contiguously formed with first jaw member 5 and includes an upper exterior surface 3 that is rounded in shape. It is contemplated within the scope of the present invention that aperture 20 could extend through the second end 11 of first jaw member 5, dividing the hinge mount 2 into having two portions. The hinge mount 2 includes hole 4 journaled laterally therethrough so as to extend intermediate first side 17 and second side 19. Disposed within each jaw bracket 130 is spring housing 55 (only one illustrated herein) for installing a torsion spring (not specifically illustrated herein) or similar element. Hole 4 aligns with hole 44 when the first jaw member 5 and second jaw member 10 are operably coupled. Pin 21 is journaled through hole 4, hole 44, and the spring mandrel holes (not specifically illustrated herein) so as to hingedly couple the first jaw member 5 and second jaw member 10 and provide for a biased first open position. Those skilled in the art will recognize that the first jaw member 5 and second jaw member 10 could be hingedly coupled utilizing numerous alternative coupling techniques and/or elements. As previously discussed herein the first jaw member 5 and second jaw member 10 have a first open position and a second closed position relative to each other. In the first open position, the first jaw member 5 is biased away from the second jaw member 10. It is contemplated within the scope of the present invention that the first jaw member 5 could be biased utilizing a variety of spring or similar elements positioned in a variety of configurations to provide this desired biased first open position. It is further contemplated within the scope of the present invention that keeper 30 could be moveably coupled with first jaw member 5 using numerous different techniques and elements in place of and/or in conjunction with having a biased open position.

Figure 3:
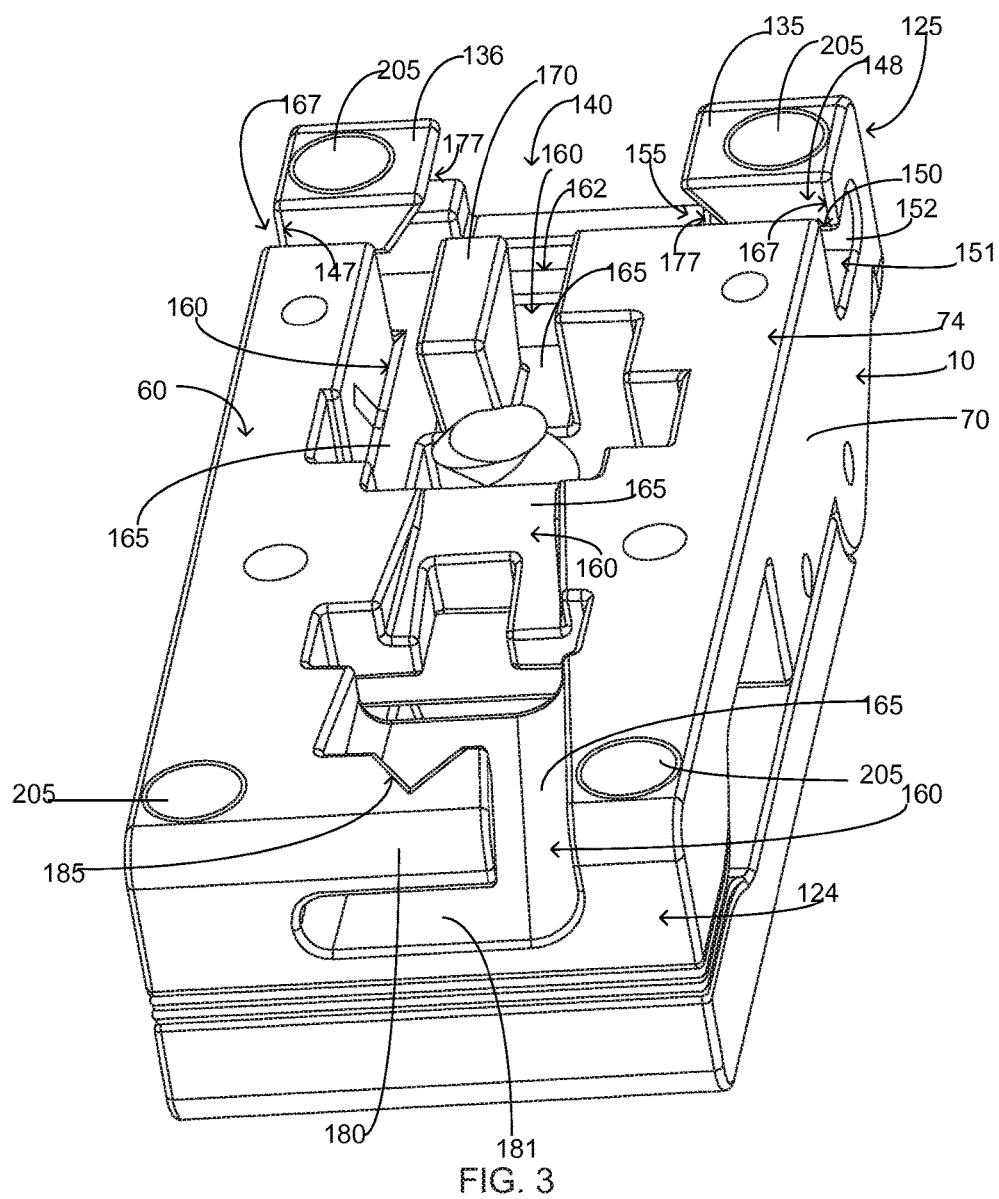
FIG. 3 is a bottom surface view of the second jaw member of the present invention.
Figure 4:
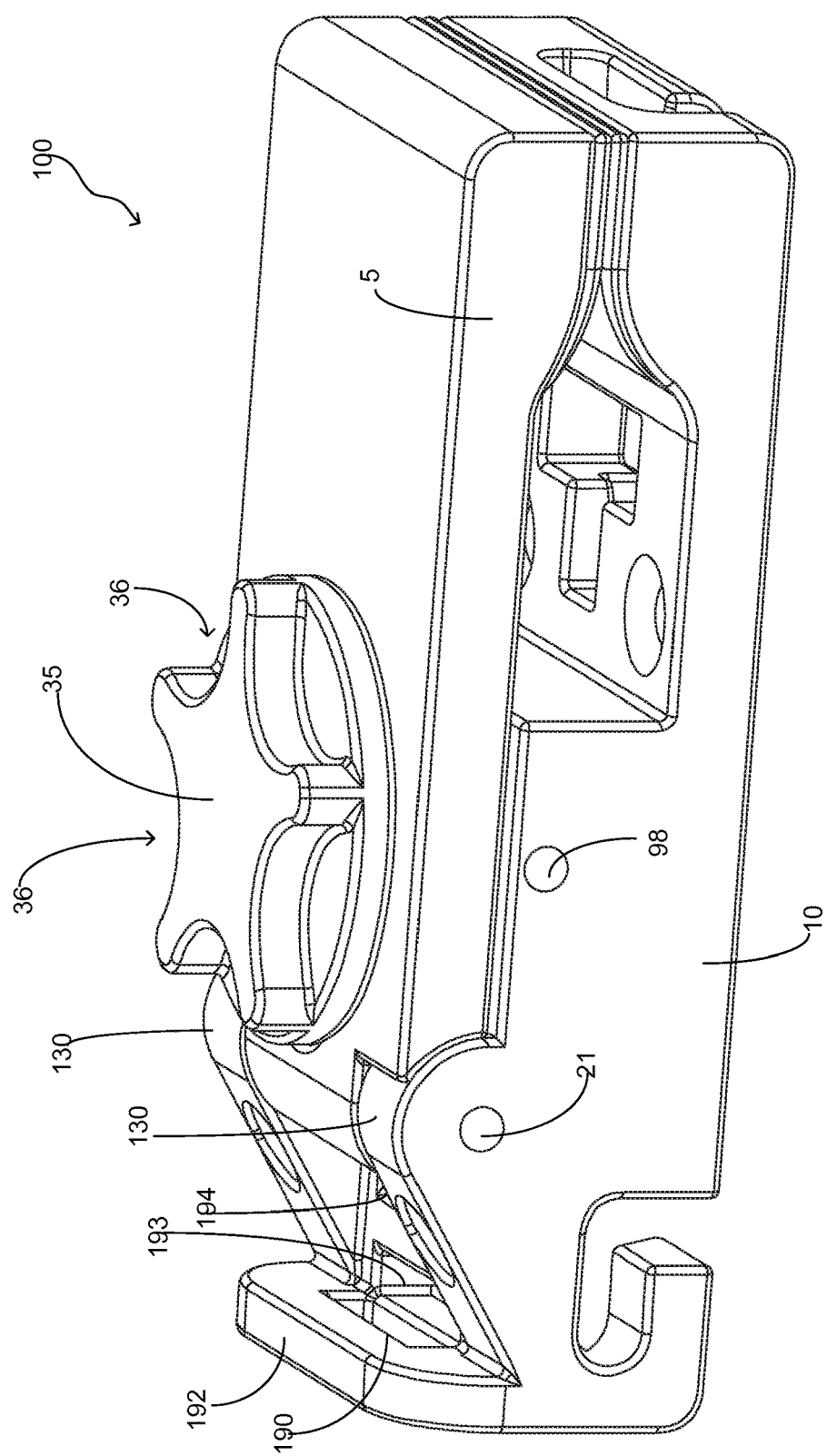
FIG. 4 is a perspective view of the present invention in a closed position.

Referring in particular to FIGS. 2 and 3, the second jaw member 10 includes sidewalls 70, top surface 72 and bottom surface 74 integrally formed and being manufactured from a suitable durable material such as but not limited to plastic. The second jaw member 10 includes a receiver mounting member 80 that is integrally formed into the top surface 72 and is elevated with respect to top surface portion 69. Receiver mounting member 80 is elevated in order to accommodate the receiver 50 therein and permit an elevated pivot point for receiver 50. The receiver mounting member 80 includes a top surface 81 and a central bore 82 wherein the central bore 82 extends intermediate top surface 81 and bottom surface 74 and is sized so as to accommodate the receiver 50 therein. Further formed as part of the receiver mounting member 80 are mounting portions 84, 86. Mounting portions 84, 86 are formed in the sides 79 of the central bore 82 having channels 93 (only one illustrated herein) configured to accommodate arms 51 (only one illustrated herein) wherein arms 51 are rotatable therein. Receiver 50 has an identical arm 51 to the illustrated arm 51 oppositely mounted on the receiver 50. Mounting portions 84, 86 include upper mounting members 87, 88 that are arcuate in shape and further include holes 91, 92 adjacent thereto. It is contemplated within the scope of the present invention that upper mounting members 87, 88 are optional and if present, may extend beyond top surface 81 to further elevate the pivot point of receiver 50. Holes 91, 92 are configured to receive pins 98, 99 wherein pins 98, 99 are journaled through holes 91, 92 and into the illustrated aperture 101 of the illustrated arm 51 and into an identical aperture 101 formed in the opposing arm 51 (not illustrated herein) respectfully so as to movably secure the receiver 50 within the central bore 82. While the receiver 50 is mounted as described herein so as to facilitate rotational mounting thereof, it is further contemplated within the scope of the invention that receiver 50 could be configured and rotatably secured utilizing numerous different shapes, techniques and elements. The rotational mounting of the receiver 50 permits the transition of the clip 100 intermediate its first open position and second closed position. Additionally, this rotational mounting of the receiver 50 assists in allowing the maintenance of the shaft 40 engagement with the receiver 50 when the clip 100 is in its first open position. The receiver 50 includes orifice 115. Orifice 115 is configured to receive shaft 40 and mateably engage therewith. As previously discussed herein shaft 40 includes threads 41 and orifice 115 while not specifically illustrated herein is configured to mateably engage with threads 41 so as to receive, retain and promote incremental movement of the shaft 40 therewith. While keeper 30 with shaft 40 and receiver 50 with orifice 115 have been disclosed herein being operable to control the movement of the first jaw member 5 and second jaw member 10, it is further contemplated within the scope of the invention that numerous types, combinations, and configurations of fasteners and/or connectors could be utilized to provide the functionality discussed herein.

Adjacent to the receiver mounting member 80 proximate second end 125 are jaw brackets 130. Jaw brackets 130 are contiguously formed with the second jaw member 10 and include hole 44 therethrough. The jaw brackets 130 are elevated with respect to the receiver mounting member 80 and pin 21 is journaled through holes 44 and 4 so as to pivotally mount the first jaw member 5 to the second jaw member 10. It is contemplated within the scope of the present invention that the first jaw member 5 and second jaw member 10 could be pivotally secured to each other utilizing numerous different techniques and elements.

The bottom surface 74 of second jaw member 10 is configured to facilitate engagement of the clip 100 with a rope or similar object. As further discussed herein the bottom surface 74 is configured to engage a rope so as to be either axially secured thereto, i.e. the clip 100 is longitudinally aligned with a portion of a rope. The bottom surface 74 is further configured to promote the suspending of the clip 100 from a portion of a horizontally orientated rope wherein the clip 100 is perpendicularly oriented to the rope and suspends downward therefrom. Referring in particular to FIG. 3 herein, the second jaw member 10 further includes arm members 135, 136. Arm members 135, 136 are contiguously formed with second jaw member 10 and are proximate opposing sides thereof. A void 140 is intermediate arm members 135, 136 and functions to provide a passage for a portion of a rope when mounting the clip 100 thereto as further discussed herein. Arm member 135, 136 are adjacent a L-shaped channel 150 having a passage 155 wherein the L-shaped channel 150 includes a first portion 151 and second portion 152. The L-shaped channel 150 extends across the second jaw member 10 having openings 167 on opposing ends 147, 148. L-shaped channel 150 functions to receive a portion of a rope therein when a user desires to suspend the clip 100 from a horizontally orientated rope wherein the clip 100 will extend downward therefrom. Arm members 135, 136 include sidewalls 177 that are angular in configuration. The angular configuration of the sidewalls 177 facilitates binding force on a rope when a rope is wrapped around either arm member 135, 136 thereby maintaining the clip 100 in position on a rope to which it has been secured. By way of example, a rope is placed in passage 155 such that a portion of the rope extends outward from the sidewalls 70 of the second jaw member 10. Subsequent to placing the rope in the passage 155 a portion of the rope is inserted into the first portion 151 of the L-shaped channel 150 and further into the second portion 152 proximate both arm members 135, 136. The L-shaped channel 150 formed by the arm members 135, 136 facilitates the ability to hang the clip 100 from a rope subsequent engagement therewith as previously described. It is contemplated within the scope of the present invention that the angular configuration of the sidewalls 177 is optional and if present, may exist on any combination of arm members 135, 136. It is also contemplated within the scope of the present invention that the portion of the second jaw member 10 containing the elements needed to secure the clip 100 to a horizontally orientated rope may be a separate structure that releasably couples to the second end 125 of the second jaw member 10.

Figure 5:
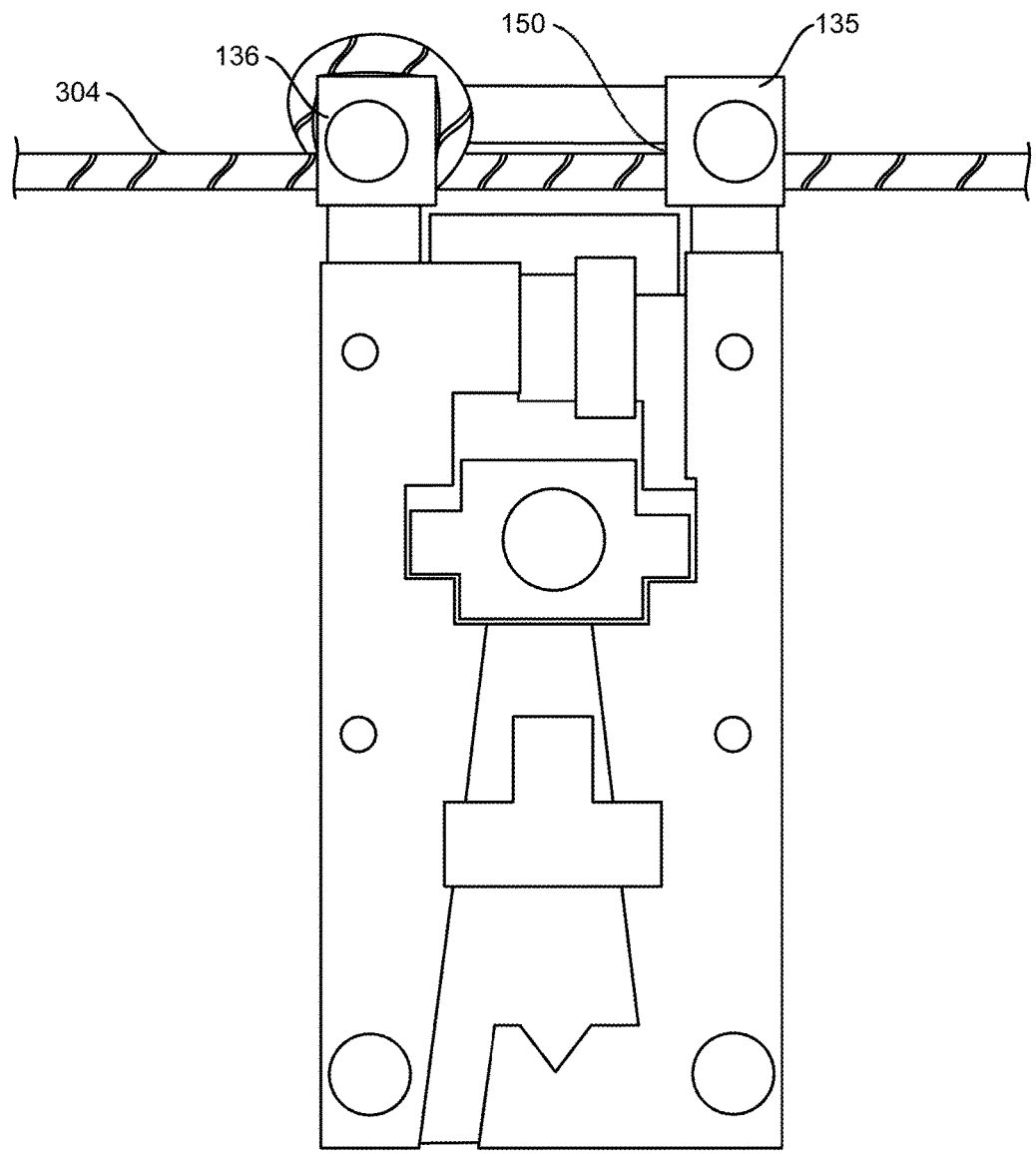
FIG. 5 is a view of an example clip showing a rope disposed within a channel.

FIG. 5 illustrates one example of the clip 100 being secured to a horizontally-oriented rope 304. The rope 304 is disposed within the channel 150 of the clip 100, and wrapped around the arm member 136, helping to secure the clip 100 to the rope 304. One of ordinary skill in the art will appreciate that the rope 304 may be wrapped around one or more arms members 135, 136 to aid in securing the clip 100 to the rope 304 when the rope is in a horizontal orientation.

The bottom surface 74 is further configured with a passage network 160 that includes a plurality of open passages 165 that are configured to receive a portion of a rope therein and promote the attachment of the clip 100 wherein the clip 100 is longitudinally secured along a portion of a vertically orientated rope. A post member 170 is secured to second jaw member 10 within the passage network 160 and extends outward therefrom. The post member 170 provides a structure to wrap a portion of a rope therearound that has been placed in the passage network 160. Wrapping a portion of a rope around the post member 170 provides a technique of securing the clip 100 in a position along a vertically orientated rope. It is contemplated within the scope of the present invention that numerous quantities of the post member 170 could be present within the passage network 160. It is further contemplated that the post member 170 could be integrally secured or removably attached to the second jaw member 10. Proximate first end 124 is leg member 180 that extends over passage 181 of plurality of open passages 165. Leg member 180 is contiguously formed with the second jaw member 10 and provides a structure to additionally wrap a portion of a rope therearound. Notch 185 is formed in leg member 180. Notch 185 provides an element to retain a portion of a rope therein and substantially inhibit movement thereof. The notch 185 is axially aligned with passage 162 which facilitates the clip 100 to be longitudinally centered along a rope when secured thereto. While a specific passage network 160 and plurality of open passages 165 has been illustrated herein, it is contemplated within the scope of the present invention that the bottom surface 74 of the second jaw member 10 could utilize a variety of configurations of a passage network 160 with one or more passages of plurality of open passages 165 in order to accomplish the desired objectives discussed herein. Additionally, it should be recognized that alternate styles and combinations of connectors could be utilized in place of and/or in conjunction with the post member 170 and leg member 180 in order to achieve the desired functionality discussed herein. It is also contemplated within the scope of the present invention that the use of notch 185 is optional and if present, any one or more connectors with a similar function to post member 170 or leg member 180 could utilize one or more notch 185 or similar construct to inhibit movement and/or facilitate longitudinally alignment of clip 100 with a rope or similar item.

Figure 6:
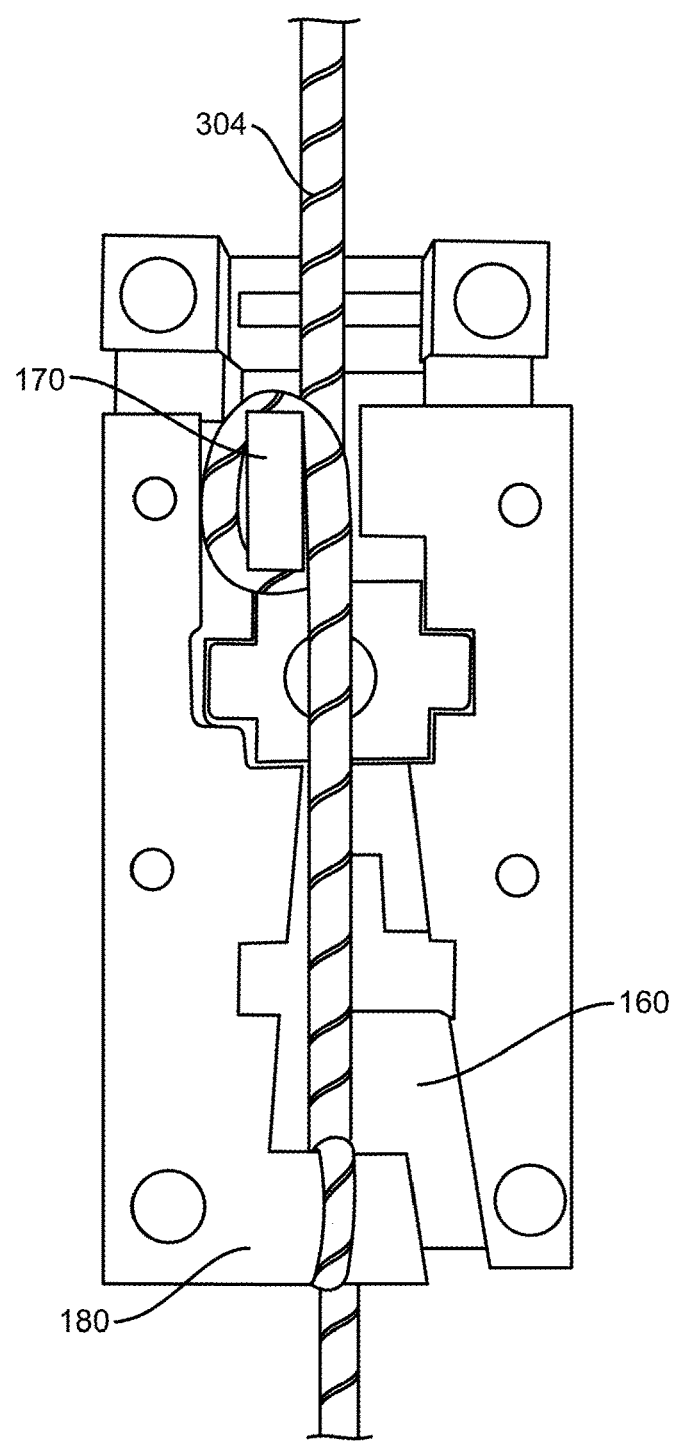
FIG. 6 is a view of an example clip showing a rope disposed within a passage network.

FIG. 6 illustrates one example of the clip 100 being secured to a vertically-oriented rope 304. The rope 304 is disposed within the passage network 160 of the clip 100. In addition, the rope 304 is wrapped around the post member 170 and the leg member 180, helping to secure the clip 100 to the rope 304. The rope 304 is further disposed within the notch 185 of the leg member 180, helping to prevent the rope 304 from sliding off the leg member 180 and to facilitate the centering of the rope 304 relative to the clip 100. One of ordinary skill in the art will appreciate that the rope 304 may be wrapped around one or more post members and/or one or more leg members to aid in securing the clip 100 to the rope 304 when the rope 304 is in a vertical orientation.

The second jaw member 10 is further provided with a plurality of slots 190. The slots 190 are operable to receive therein a nylon strap or similar object and facilitate the securing of the clip 100 thereto. A first slot 191 is formed in wall member 192 wherein wall member 192 extends upward from the top surface 72 at second end 125. A second slot 193 and third slot 194 are formed in the second jaw member 10 intermediate the jaw brackets 130. The second slot 193 and third slot 194 are parallel and adjacent to each other. It is contemplated within the scope of the present invention that wall member 192 is optional and second jaw member 10 could be configured with as few as one slot 190 or more than three slots 190 so as to provide the ability to secure the clip 100 to a nylon strap or similar object. It is also contemplated within the scope of the present invention that the portion of the second jaw member 10 containing the elements needed to secure the clip 100 to a strap may be a separate structure that releasably couples to the second end 125 of the second jaw member 10.

Secured to the second jaw member 10 on the bottom surface 74 thereof are a plurality of keepers 205. Keepers 205 are mounted to the second jaw member 10 utilizing suitable durable techniques and are manufactured from a ferromagnetic material so as to facilitate securing the clip 100 to a metal surface. While four keepers 205 are illustrated herein, it is contemplated within the scope of the present invention that the clip 100 could include various quantities of keepers 205.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A clip operable to grasp an object comprising:
   a first jaw member including a first end;
   a second jaw member including a first end, said first jaw member and said second jaw member being connected to enable the opening and closing movement of the clip;
   a receiver pivotally attached directly or indirectly to said second jaw member, said receiver including a connector; and
   a keeper including a connector, said connector of said keeper being configured to couple with said connector of said receiver, said keeper being operable to facilitate opening and closing of the clip, said keeper including a head, said head of said keeper operable to slidably travel longitudinally relative to said first jaw member as the clip is being opened or closed;
   wherein the first and second jaw members have a wide degree of separation capability therebetween to support loading and gripping of thicker material.

2. The clip as recited in claim 1, wherein said first jaw member includes an aperture, said aperture is configured to enable said keeper to engage said receiver therethrough, said keeper is operable to pivot with said receiver relative to said second jaw member, and said keeper is movable relative to said receiver to facilitate opening and closing movement of the clip.

3. The clip as recited in claim 1, wherein said keeper is operable to apply force to said first jaw member.

4. The clip as recited in claim 1, wherein said head of said keeper is attached to said connector of said keeper, said head of said keeper being operable to apply force to said first jaw member.

5. The clip as recited in claim 1, wherein said first jaw member is biased toward an open position.

6. The clip as recited in claim 1, wherein said first jaw member is configured to enable said first jaw member to be moved to a grasping position directly by a user without moving the keeper, so as to facilitate faster adjustment of said keeper.

7. The clip as recited in claim 1, wherein said keeper is operably coupled with said first jaw member such that said first end of said first jaw member moves away from said first end of said second jaw member as said keeper moves away from said receiver.

8. The clip as recited in claim 1, wherein said connector of said receiver and said connector of said keeper include mateable threads so as to control movable coupling therebetween, and said head of said keeper is a knob configured to be operated by hand.

9. The clip as recited in claim 1, wherein said connector of said receiver is a threaded orifice, and said connector of said keeper is a threaded shaft.

10. The clip as recited in claim 1, wherein the clip provides a degree of separation capability of 30 degrees or more between said first and second jaw members and wherein the clip provides control over the grasping force of the clip throughout the operational range of said separation.

11. The clip as recited in claim 2, wherein said aperture in said first jaw member is shaped to receive a portion of said receiver therein so as to enable an elevated position for said receiver, resulting in additional separation capability between said first ends of said first and second jaw members.

12. The clip as recited in claim 1, wherein said second jaw member includes a mounting structure, said mounting structure extending upward from said second jaw member, and wherein said receiver is pivotally attached directly or indirectly to said mounting structure.

13. The clip as recited in claim 12, wherein said mounting structure includes a top surface, a first upper mounting member and a second upper mounting member, wherein said first upper mounting member and said second upper mounting member are formed with said top surface of said mounting structure and extend upward therefrom so as to establish an elevated pivot point for said receiver, resulting in additional separation capability between said first ends of said first and second jaw members.

14. A clip operable to grasp an object comprising:
   a first jaw member including a first end and an aperture;
   a second jaw member including a first end, said first jaw member and said second jaw member being connected to enable the opening and closing movement of the clip; and
   a keeper configured to pass through said aperture of said first jaw member and connect to said second jaw member;
   wherein said keeper is operable to facilitate opening and closing of the clip, wherein said aperture of said first jaw member is sized to provide a degree of separation capability of 30 degrees or more between said first and second jaw members, wherein said keeper is operable to provide control over the grasping force of the clip throughout the operational range of said separation;
   wherein said first jaw member is biased toward an open position.

15. The clip as recited in claim 14, wherein said keeper includes a head and a connector.

16. The clip as recited in claim 15, wherein said head of said keeper is operable to slidably travel longitudinally relative to said first jaw member as the clip is being opened or closed.

17. The clip as recited in claim 14, wherein said keeper is operable to apply force to said first jaw member.

18. The clip as recited in claim 14, wherein said first jaw member is configured to enable said first jaw member to be moved to a grasping position directly by a user without moving the keeper, so as to facilitate faster adjustment of said keeper.

19. The clip as recited in claim 14, wherein said keeper is operably coupled with said first jaw member such that said first end of said first jaw member moves away from said first end of said second jaw member as said keeper is loosened.

20. The clip as recited in claim 15, wherein said second jaw member includes a pivotally attached receiver comprising a connector, said receiver being attached to said second jaw member either directly or indirectly, said connector of said keeper being operable to travel through said aperture of said first jaw member to couple with said connector of said receiver to facilitate opening and closing of the clip.

21. A clip operable to grasp an object comprising:
a first jaw member;
a second jaw member including a bottom surface, a first end and a second end, said first jaw member and said second jaw member being connected to enable the opening and closing movement of the clip, said bottom surface of said second jaw member including a passage network, wherein at least one portion of said passage network is recessed into said bottom surface of said second jaw member, said passage network comprising at least one open passage configured to receive a portion of a rope therein; and
at least one connector secured to or formed in said bottom surface of said second jaw member, said at least one connector being operable to releasably engage with a portion of a rope;
wherein said second jaw member is operable to be releasably secured to a rope that is in a somewhat vertical orientation.

22. The clip as recited in claim 21, wherein at least one of said at least one connector is proximate said first end of said second jaw member so as to facilitate securement to a rope.

23. The clip as recited in claim 21, wherein at least one of said at least one connector is a leg member, said leg member is formed with said bottom surface of said second jaw member, said leg member is configured to extend across a portion of at least one of said at least one open passage, said leg member is operable to have a portion of a rope be trapped or wrapped therearound.

24. The clip as recited in claim 21, wherein said passage network is configured with said at least one connector so as to facilitate the releasable securing of the clip to a rope such that the clip is substantially centered on the rope.

25. The clip as recited in claim 21, wherein said at least one connector is integrally formed with said bottom surface of said second jaw member so as to provide a structure for securing a rope.

26. The clip as recited in claim 21, wherein at least one of said at least one connector is proximate said second end of said second jaw member so as to facilitate securement to a rope.

27. The clip as recited in claim 21, wherein at least one of said at least one connector is a post member, said post member is positioned adjacent to at least one of said at least one open passage wherein said post member is operable to have a portion of a rope be trapped or wrapped therearound so as to facilitate position securement of the clip on said rope.

28. The clip as recited in claim 21, wherein at least one of said at least one connector further includes at least one notch so as to receive a portion of a rope therein and limit movement thereof.

29. The clip as recited in claim 21, wherein the clip provides a degree of separation capability of 30 degrees or more between said first and second jaw members and wherein the clip provides control over the grasping force of the clip throughout the operational range of said separation.

30. A clip operable to grasp an object comprising:
a first jaw member; and
a second jaw member including a bottom surface, sidewalls, a first end and a second end, said first jaw member and said second jaw member being pivotally connected to enable the opening and closing movement of the clip, said second jaw member further including a channel recessed into said bottom surface of said second jaw member, wherein said channel extends substantially perpendicular to and through said sidewalls of said second jaw member, wherein said channel includes a first portion shaped to receive a portion of a rope therein and a second portion shaped to receive the portion of the rope therein after the rope travels through said first portion, wherein said second portion of said channel is configured to releasably secure the clip to the portion of the rope when the rope is in a somewhat horizontal orientation.

31. The clip as recited in claim 30, wherein said channel is generally L-shaped.

32. The clip as recited in claim 30, wherein said channel is proximate said second end of said second jaw member.

33. The clip as recited in claim 30, wherein said channel is configured such that a rope engaged with said channel does not interfere with the ability of said bottom surface of said second jaw member to rest directly on a surface.

34. The clip as recited in claim 30, wherein said second jaw member further includes a first arm member and a second arm member, said first arm member and said second arm member are proximate said second end of said second jaw member and adjacent to said channel, and said second jaw member further includes a void intermediate said first arm member and said second arm member.

35. The clip as recited in claim 34, wherein at least one of said first arm member and said second arm member further include an angular sidewall or notch operable to bind a rope subsequent the rope being wrapped therearound.

36. The clip as recited in claim 30, wherein the clip provides a degree of separation capability of 30 degrees or more between said first and second jaw members and wherein the clip provides control over the grasping force of the clip throughout the operational range of said separation.

37. A clip operable to grasp an object comprising:
a first jaw member; and
a second jaw member including a bottom surface, sidewalls, a first end and a second end, said first jaw member and said second jaw member being pivotally connected to enable the opening and closing movement of the clip;
wherein a plurality of slots are formed in said second jaw member, at least two of said slots adjacent each other, each of said plurality of slots having a length and a width, wherein said length is substantially greater than said width, and wherein each of said plurality of slots is disposed with its length generally perpendicular to said sidewalls of said second jaw member;

wherein said bottom surface of said second jaw member includes a void beneath said adjacent slots such that a strap mounted to the clip does not interfere with the ability of said bottom surface of said second jaw member to rest directly on a surface.

38. The clip as recited in claim 37, wherein said plurality of slots are positioned proximate said second end of said second jaw member.

39. The clip as recited in claim 37, wherein said second jaw member further includes a first arm member and a second arm member, said first arm member and said second arm member are proximate said second end of said second jaw member, and said second jaw member further includes a void intermediate said first arm member and said second arm member to allow passage of a strap therebetween.

40. The clip as recited in claim 37, wherein said second jaw member includes a wall member extending upward from said second jaw member proximate said second end of said second jaw member, wherein said wall member includes at least one aperture formed therein so as to receive a portion of a strap therethrough.

41. The clip as recited in claim 37, wherein the clip provides a degree of separation capability of 30 degrees or more between said first and second jaw members and wherein the clip provides control over the grasping force of the clip throughout the operational range of said separation.

42. The clip as recited in claim 1, wherein said keeper is operable to engage with said first jaw member and said second jaw member, wherein only one of said keeper's engagement with said first jaw member and said second jaw member allows pivotal movement of said keeper relative to the respective jaw member.

43. The clip as recited in claim 14, wherein said keeper is operable to engage with said first jaw member and said second jaw member, wherein only one of said keeper's engagement with said first jaw member and said second jaw member allows pivotal movement of said keeper relative to the respective jaw member.

44. The clip as recited in claim 1, wherein said second jaw member includes a plurality of sidewalls, wherein said receiver is pivotally and laterally mounted to said sidewalls of said second jaw member.

45. The clip as recited in claim 20, wherein said second jaw member includes a plurality of sidewalls, wherein said receiver is pivotally and laterally mounted to said sidewalls of said second jaw member.

46. A clip operable to grasp an object comprising:
a first jaw member including a first end and an aperture;
a second jaw member including a first end, said first jaw member and said second jaw member being connected to enable the opening and closing movement of the clip; and
a keeper configured to pass through said aperture of said first jaw member and engage with said second jaw member;
wherein said keeper is operable to facilitate opening and closing of the clip, wherein said aperture of said first jaw member is sized to provide a degree of separation capability of 30 degrees or more between said first and second jaw members, wherein said keeper is operable to engage with said first jaw member, wherein only one of said keeper's engagement with said first jaw member and said second jaw member allows pivotal movement of said keeper relative to the respective jaw member.

47. The clip as recited in claim 46, wherein said keeper includes a head and a connector.

48. The clip as recited in claim 47, wherein said head of said keeper is operable to slidably travel longitudinally relative to said first jaw member as the clip is being opened or closed.

49. The clip as recited in claim 46, wherein said keeper is operable to apply force to said first jaw member.

50. The clip as recited in claim 47, wherein said head of said keeper is operable to apply force to said first jaw member.

51. The clip as recited in claim 46, wherein said first jaw member is configured to enable said first jaw member to be moved to a grasping position directly by a user without moving the keeper, so as to facilitate faster adjustment of said keeper.

52. The clip as recited in claim 46, wherein said keeper is operably coupled with said first jaw member such that said first end of said first jaw member moves away from said first end of said second jaw member as said keeper is loosened.

53. The clip as recited in claim 47, wherein said second jaw member includes a pivotally attached receiver comprising a connector, said receiver being attached to said second jaw member either directly or indirectly, said connector of said keeper being operable to travel through said aperture of said first jaw member to couple with said connector of said receiver to facilitate opening and closing of the clip.

54. The clip as recited in claim 53, wherein said second jaw member includes a plurality of sidewalls, wherein said receiver is pivotally and laterally mounted to said sidewalls of said second jaw member.

55. The clip as recited in claim 46, wherein said first jaw member is biased toward an open position.

56. The clip as recited in claim 46, wherein said keeper is operable to provide control over the grasping force of the clip throughout the operational range of said separation between said first and second jaw members.

57. The clip as recited in claim 53, wherein said aperture in said first jaw member is shaped to receive a portion of said receiver therein so as to enable an elevated position for said receiver, resulting in additional separation capability between said first ends of said first and second jaw members.

58. The clip as recited in claim 53, wherein said keeper is operable to pivot with said receiver relative to said second jaw member, and said keeper is movable relative to said receiver to facilitate opening and closing movement of the clip.

59. The clip as recited in claim 53, wherein said connector of said receiver and said connector of said keeper include mateable threads so as to control movable coupling therebetween, and said head of said keeper is a knob configured to be operated by hand.

60. The clip as recited in claim 53, wherein said connector of said receiver is a threaded orifice, and said connector of said keeper is a threaded shaft.

61. The clip as recited in claim 20, wherein said aperture in said first jaw member is shaped to receive a portion of said receiver therein so as to enable an elevated position for said receiver, resulting in additional separation capability between said first ends of said first and second jaw members.

62. The clip as recited in claim 15, wherein said head of said keeper is operable to apply force to said first jaw member.

63. The clip as recited in claim 20, wherein said keeper is operable to pivot with said receiver relative to said second jaw member, and said keeper is movable relative to said receiver to facilitate opening and closing movement of the clip.

64. The clip as recited in claim 20, wherein said connector of said receiver and said connector of said keeper include mateable threads so as to control movable coupling therebetween, and said head of said keeper is a knob configured to be operated by hand.

65. The clip as recited in claim 20, wherein said connector of said receiver is a threaded orifice, and said connector of said keeper is a threaded shaft.

66. The clip as recited in claim 21, wherein said first jaw member is biased toward an open position.

67. The clip as recited in claim 21, wherein said clip includes a keeper.

68. The clip as recited in claim 67, wherein said keeper includes a head, said head being operable to slidably travel longitudinally relative to at least one of said first and second jaw members as the clip is being opened or closed.

69. The clip as recited in claim 67, wherein said keeper is operable to engage with said first jaw member and said second jaw member, wherein only one of said keeper's engagement with said first jaw member and said second jaw member allows pivotal movement of said keeper relative to the respective jaw member.

70. The clip as recited in claim 67, wherein said clip includes a pivotally attached receiver comprising a connector, said keeper comprising a connector, said connector of said receiver being operable to couple with said connector of said keeper to facilitate opening and closing of the clip.

71. The clip as recited in claim 70, wherein said keeper is operable to pivot with said receiver relative to said second jaw member, and said keeper is movable relative to said receiver to facilitate opening and closing movement of the clip.

72. The clip as recited in claim 30, wherein said first jaw member is biased toward an open position.

73. The clip as recited in claim 30, wherein said clip includes a keeper.

74. The clip as recited in claim 73, wherein said keeper includes a head, said head being operable to slidably travel longitudinally relative to at least one of said first and second jaw members as the clip is being opened or closed.

75. The clip as recited in claim 73, wherein said keeper is operable to engage with said first jaw member and said second jaw member, wherein only one of said keeper's engagement with said first jaw member and said second jaw member allows pivotal movement of said keeper relative to the respective jaw member.

76. The clip as recited in claim 73, wherein said clip includes a pivotally attached receiver comprising a connector, said keeper comprising a connector, said connector of said receiver being operable to couple with said connector of said keeper to facilitate opening and closing of the clip.

77. The clip as recited in claim 76, wherein said keeper is operable to pivot with said receiver relative to said second jaw member, and said keeper is movable relative to said receiver to facilitate opening and closing movement of the clip.

78. The clip as recited in claim 37, wherein said first jaw member is biased toward an open position.

79. The clip as recited in claim 37, wherein said clip includes a keeper.

80. The clip as recited in claim 79, wherein said keeper includes a head, said head being operable to slidably travel longitudinally relative to at least one of said first and second jaw members as the clip is being opened or closed.

81. The clip as recited in claim 79, wherein said keeper is operable to engage with said first jaw member and said second jaw member, wherein only one of said keeper's engagement with said first jaw member and said second jaw member allows pivotal movement of said keeper relative to the respective jaw member.

82. The clip as recited in claim 79, wherein said clip includes a pivotally attached receiver comprising a connector, said keeper comprising a connector, said connector of said receiver being operable to couple with said connector of said keeper to facilitate opening and closing of the clip.

83. The clip as recited in claim 82, wherein said keeper is operable to pivot with said receiver relative to said second jaw member, and said keeper is movable relative to said receiver to facilitate opening and closing movement of the clip.

\* \* \* \* \*